F. A. KOHLHEPP.
LOCKET.
APPLICATION FILED JULY 19, 1917.

1,342,817.

Patented June 8, 1920.
3 SHEETS—SHEET 1.

WITNESS
Howard P. King

INVENTOR:
Frederick A. Kohlhepp,
BY
Marble & Everett,
ATTORNEYS.

F. A. KOHLHEPP.
LOCKET.
APPLICATION FILED JULY 19, 1917.

1,342,817.

Patented June 8, 1920.
3 SHEETS—SHEET 2.

WITNESS
Howard P. King

INVENTOR:
Frederick A. Kohlhepp.
BY
Marble & Everett,
ATTORNEYS.

F. A. KOHLHEPP.
LOCKET.
APPLICATION FILED JULY 19, 1917.

1,342,817.

Patented June 8, 1920.
3 SHEETS—SHEET 3.

WITNESS
Howard P. King.

INVENTOR:
Frederick A. Kohlhepp,
BY
Marble & Everett,
ATTORNEYS.

UNITED STATES PATENT OFFICE.

FREDERICK A. KOHLHEPP, OF NEWARK, NEW JERSEY, ASSIGNOR TO LARTER & SONS, OF NEWARK, NEW JERSEY, A FIRM COMPOSED OF FREDERICK H., HARRY C., AND HALSEY M. LARTER.

LOCKET.

1,342,817.  Specification of Letters Patent.  Patented June 8, 1920.

Application filed July 19, 1917. Serial No. 181,465.

*To all whom it may concern:*

Be it known that I, FREDERICK A. KOHLHEPP, a citizen of the United States of America, and a resident of Newark, in the county of Essex and State of New Jersey, have invented new and useful Improvements in Lockets, of which the following is a specification.

The objects of this invention are to embody in a locket the identifying tag worn by soldiers; to provide a convenient means for associating with said tag a photograph or the like; to combine the tag with the locket so that the tag is exposed for examination; to enable the tag and locket to be separated for further examination, stamping or interchange of tags, when desired, without the use of any tools; to insure against any inadvertent detachment of the tag and locket from each other; to provide a convenient and attractive article of the character described; to secure a simple construction which can be easily operated, and to obtain other advantages and results as may be brought out in the following description.

Referring to the accompanying drawings in which like numerals of reference indicate the same parts throughout the several views, Figures 1 and 2 are elevations looking at opposite sides of a locket embodying my invention;

Figure 1:
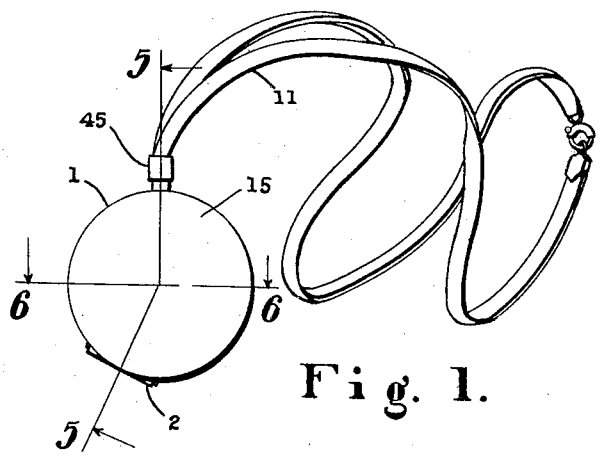
Figure 2:
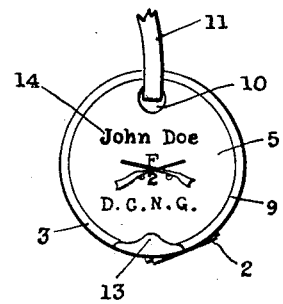
Figure 3:
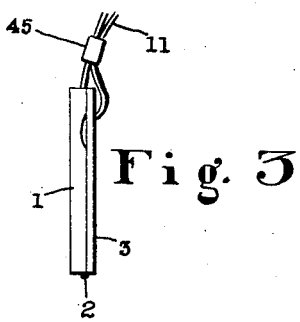
Fig. 3 is an edge view looking at the righthand side of Fig. 1.
Figure 4:
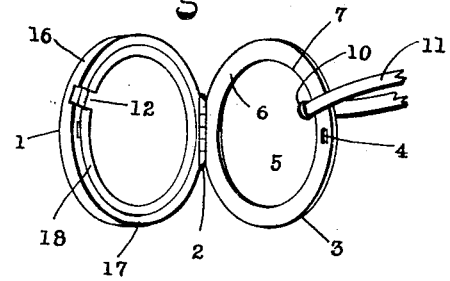
Fig. 4 is a plan with the locket open.
Figure 5:
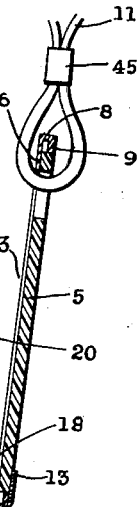
Fig. 5 is a sectional view on line 5—5 of Fig. 1 with the locket partially open.
Figure 6:
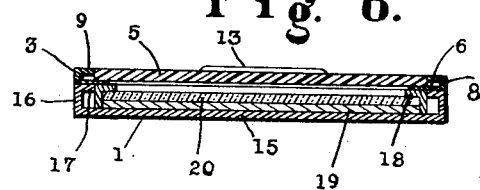
Fig. 6 is a cross-sectional view on line 6—6 of Fig. 1.

In the specific embodiment of the invention illustrated more particularly in Figs. 1-6 of the drawings, the reference numeral 1 indicates the body portion of my improved locket to one side of which is hinged, as at 2, a frame 3. It is to be understood that the body portion 1 and frame 3 may be swung together, flatwise of each other, into closed position, and a suitable catch 4 is provided opposite the hinge 2 for holding said body portion and frame in such closed position. The construction of the frame 3 is such that it will support an identifying tag 5, such as used by soldiers, and as shown in this disclosure the tag is preferably exposed at the outside of the locket so the locket does not have to be opened to read the identification on the tag. Furthermore, said frame is preferably open, that is, arranged to expose both sides of the tag, so that the face on the outside of the locket can not only be seen, but by opening the locket the other face of the tag can be seen. The construction of frame preferably employed provides a rim 6 against which the margin of the tag may engage flatwise, the opening 7 or cut-away portion within the rim being of less diameter than said tag. Peripherally of the frame is a rim 8 which has at its edge away from the rim an inturned portion 9. Preferably the opening provided by this inturned portion is just sufficient to receive the tag, and the outer surface of said portion in the plane of the frame is preferably spaced from the rim a distance substantially equal to the thickness of the tag, so that when the tag is carried by the frame the outer surfaces of the tag and inturned portion of the rim are substantially in the same plane.

The identification tag 5, as usually made, is a flat disk having near one edge a hole 10 through which a strap or other suspensory device 11 passes for supporting it around the soldier's or other wearer's neck. In the preferred construction, now being described, the strap 11 passes through the frame but not the body portion of the locket, said body portion being notched as at 12 on its face toward the frame so as to permit the strap to pass outwardly between said frame and body portion, and obviously when the locket is closed the identification tag has to be in the frame with its strap in such position that it will enter the notch of the body portion, so that the notch is therefore made at the top of the locket. Opposite the notch (diametrically) and preferably integral with the frame is a retainer 13 between which and the rim of the frame the margin of the tag may be inserted for holding the tag against lateral displacement from the frame. As shown in those Figs. 1-6, the retainer is upon the outside of the frame to which it is secured by any suitable means such as by soldering. In operation, the bottom of the tag is inserted between the rim 6 and said retainer and then the upper portion of the tag is swung into the frame flatwise against the rim and in hanging upon the strap 11 the tag is held at its upper end within the frame by said strap. The identification, such as that shown at 14, is upon the face of the tag at the outside of the locket, so that upon inspection the soldier hangs the locket with the identification exposed toward the front and the locket does not interfere with such inspection nor are the contents of the locket disclosed to view. Furthermore, by my construction, the tag is so combined with the locket that it may be separated therefrom for further examination or for stamping the tag without necessarily removing the tag or locket from the strap 11. It is unnecessary to use any tools to separate the said parts, as the tag may be pushed with the fingers right out of the frame. Furthermore, as long as the strap is held together at its ends, the separation of the tag from the locket by intention or inadvertence will not detach the tag from the locket, so it will not become lost and can be returned to the locket very readily and with the right face toward the outside.

Preferably the body portion 1 of the locket provides an outer disk-like wall 15 at the edge of which is a rim 16 having an inturned portion 17. A removable ring 18 frictionally held by said inturned portion 17 of the rim is adapted to retain a photograph or other keepsake 19 and a transparent covering 20 within said body portion. It will be understood that the picture and covering are on the inside of the locket so as to be both covered and protected by the frame and tag, and may be seen by opening the locket. It may be pointed out at this time that the tag which engages the rim 6 is prevented from being shoved inwardly because of its engagement with said rim so that squeezing the locket will not force the tag inward to break the crystal.

Figure 7:
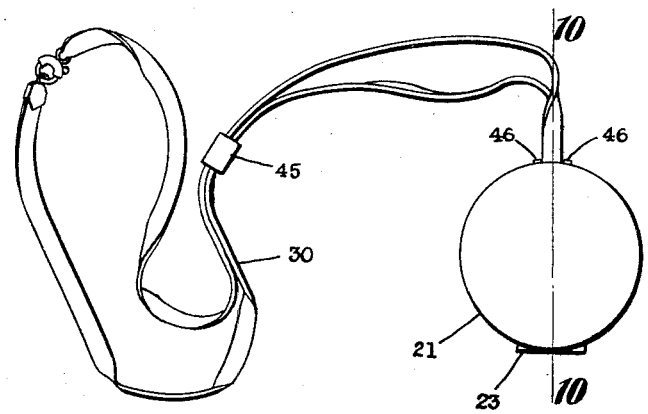
Figs. 7 and 8 are elevations, looking at opposite sides, of a modified construction of locket.
Figures 8, 9:
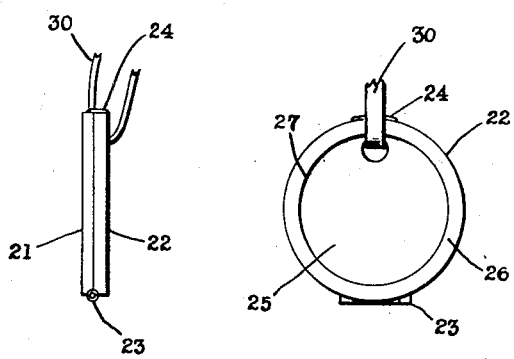
Fig. 9 is an edge view looking at the righthand side of Fig. 7.
Figures 10, 11:
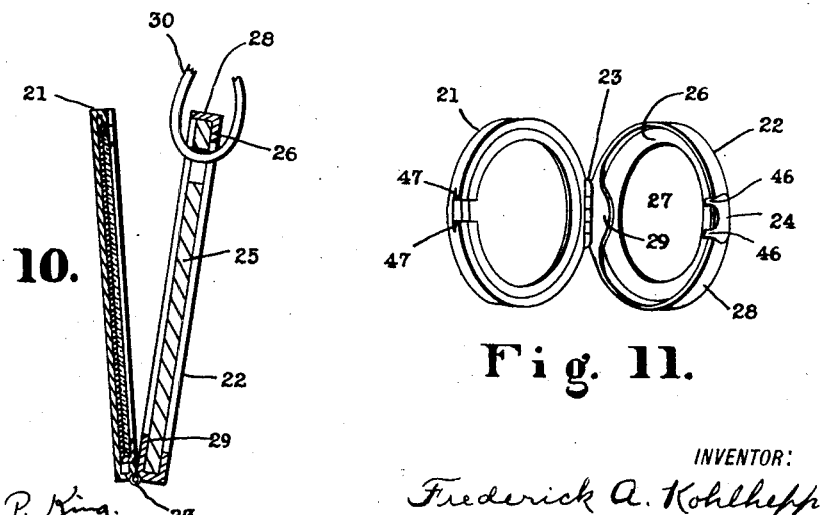
Fig. 10 is a vertical central section on line 10—10 of Fig. 7 with the locket partially open.
Fig. 11 is a plan with the locket open and the identifying tag removed.

Referring now to Figs. 7-11 inclusive, I have shown a construction wherein the tag is inserted in the frame from the inside of the locket. In this instance, the body portion 21 has a frame 22 hinged to it as at 23, one of the parts, as the frame 22, having a catch 24 for engaging the other part to hold the body portion and frame closed flatwise together. The particular catch in this instance is shown as having a pair of spaced members 46 adapted to engage recesses 47 on opposite sides of the notch for the suspending strap , so that the catch when closed surrounds or incloses the suspending strap, but any suitable catch means could be employed. For supporting the identification tag 25 in the frame, said frame provides a rim 26 against which the margin of the tag may engage flatwise, in this disclosure said rim being shown as at the outside of the locket, the identification tag being viewed through the opening 27 or cut-away portion within the rim, which it is to be understood is of less diameter than the tag. As in the previous case, a peripheral rim 28 is provided at the edge of the frame of a size suitable to receive the tag therein, and I have shown this rim of sufficient depth to not only receive the tag, but deep enough so that a retainer 29 may be provided at one edge for the tag and not project beyond the plane of the edge of the rim. Preferably this retainer is at the hinged portion of the frame, and it is to be understood that the tag is inserted between the rim and the retainer from the inside of the locket while the locket is open. Thus when closed, the locket is suspended by the strap 30 passing through the tag and frame. In this construction the locket has to be opened to insert or remove the identification tag, and obviously inadvertent separation is less likely to occur by this construction than by that shown in Figs. 1-6. However, the tag may be separated from the locket for further examination or stamping without necessarily removing the tag or locket from the strap and without the use of any tools. Likewise, the strap prevents detachment of the tag from the locket when thus separated.

Figure 12:
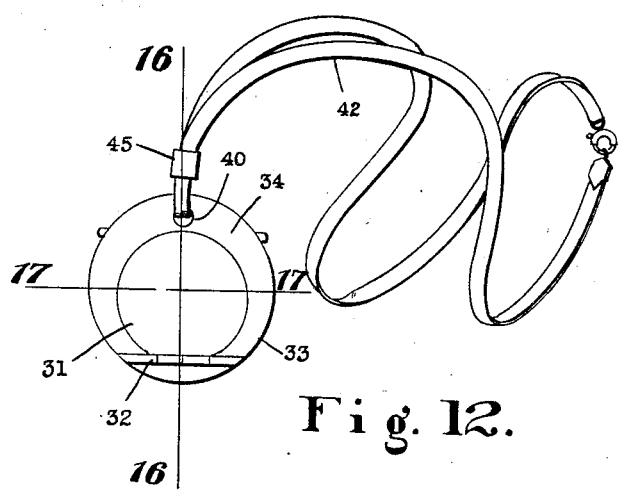
Figs. 12 and 13 are elevations, from opposite sides, of a still further modified construction of the locket.
Figure 13:
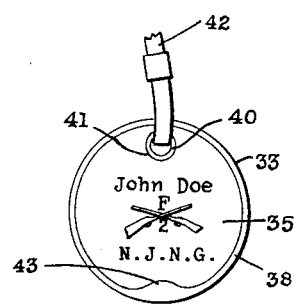
Figure 14:
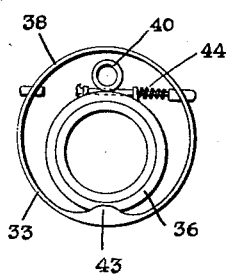
Fig. 14 is an elevation similar to Fig. 13 with the identifying tag omitted.
Figure 15:
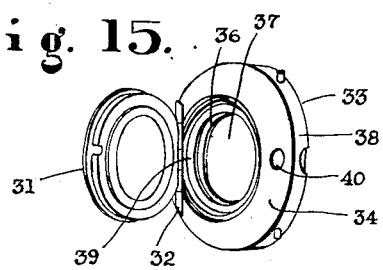
Fig. 15 is a plan with the locket open.
Figure 16:
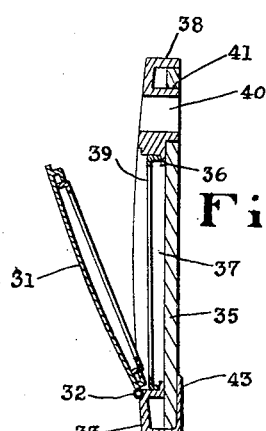
Fig. 16 is a vertical central section on line 16—16 of Fig. 12.
Figure 17:
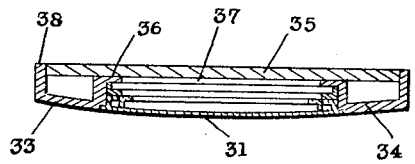
Fig. 17 is a transverse cross-section on line 17—17 of Fig. 12.

In the construction shown in Figs. 12-17, inclusive, a body portion 31 and a frame 33 are shown hinged together as at 32, the frame in this instance having a disk-like wall 34 at its side away from the tag 35 and the body portion 31 being smaller in diameter and adapted to close into a cavity in said wall. Within the frame is provided a rim 36 against which the tag will engage for limiting its inward movement when being inserted, and preferably the frame is open or cutaway as at 37 within this peripheral seat. Furthermore, the said opening is preferably eccentric with respect to the frame and shown nearer the bottom of the locket than the top. At the periphery of the frame is provided a flange 38 adapted to overlie the peripheral edge of the tag. On the opposite side of the seat 36 from the tag is a ring 39 adapted to clamp a picture or other keepsake, (not shown) between itself and the tag. As stated above, the opening 37 is eccentric with respect to the periphery of the frame so that one portion of the wall 34 is wider than the opposite portion, and at this wider portion I provide a hollow neck 40 preferably integral with the said wall and extending toward the open side of the frame. This neck is small enough in diameter to be inserted in the hole 41 of the identifying tag or disk, and is adapted to receive through itself the strap 42 or other suspending means. At the periphery of the frame opposite the neck 40 (diametrically) is a retainer 43 spaced from the seat 36 far enough to permit the tag or disk to be inserted therebetween. This retainer will hold the tag at one edge, and the neck 40 and the strap 42 will coöperate to hold the tag at its opposite edge securely in the frame.

The body portion in this construction is similar to that already described in connection with the preferred construction of locket, but is of a smaller size, hinged upon the face of the locket and closes into the frame, a spring catch 44 being shown in the frame for holding the body portion closed. Preferably the strap or suspending means 11 is provided with a clasp 45 adapted to slide down close to the locket and hold the two adjacent portions of the strap together, as shown in the drawings. This serves to more positively retain the tag or disk in position in the frame, at its portion opposite the retainer. Furthermore, the notch or recess in the body portion of the locket preferably receives the strap or suspending means loosely, so that said strap or suspending means can slide therein.

Obviously detail modification and changes may be made in manufacturing my improved locket without departing from the spirit and scope of the invention, and I do not wish to be understood as limiting myself except as required by the following claims when construed in the light of the prior art.

Having thus described the invention, what I claim is—

1. In a device of the character described, a pair of hingedly connected members one of which is adapted to detachably receive a disk, and suspending means for supporting both said disk and said hingedly connected members and connecting said disk and hingedly connected members when they are released and separated from each other, said suspending means passing between said hingedly connected members when they are closed together.

2. In a device of the character described, a disk, a locket comprising two hingedly connected sections to receive said disk between them, and suspending means supporting both said disk and said locket and connecting said disk and locket when they are released and separated from each other.

3. In a locket, a body portion, a frame hinged to said body portion, a disk in said frame apertured adjacent thereto, and suspending means passed through said frame and apertured disk, the body portion being marginally recessed to receive said suspending means.

4. In a locket, a body portion, a frame hinged to said body portion, a disk in said frame apertured adjacent thereto, suspending means passed through said frame and apertured disk, and means for holding said frame and body portion closed together, one of said parts being marginally recessed to receive said suspending means.

5. In a locket, a body portion adapted to receive a picture, a disk, a frame hinged to said body portion having a rim adapted to overlie the margin of said disk and retain said disk between said rim and body portion when the locket is closed, and means for both suspending the locket and retaining the disk in the frame when the locket is opened.

6. In a locket, a body portion adapted to receive a picture, an apertured disk, a frame adapted to engage the body portion and retain said disk between the frame and body portion when the locket is closed, and suspending means extending through both said disk and frame whereby detachment of said parts is prevented when the locket is opened.

7. In a locket, a body portion adapted to receive a picture, an apertured disk, a frame adapted to engage the body portion and retain said disk between the frame and body portion when the locket is closed, a retainer at the side of the frame toward the body portion for holding the disk in the frame, and suspending means extending through both said disk and frame at the portion thereof opposite said retainer.

8. In a locket, a body portion adapted to receive a picture, a frame hinged to said body portion, an apertured removable disk adapted to be held by said frame and coöperate therewith to form a closure for said body portion, and a tape extending through the aperture of the disk and adapted to project from the locket when closed for suspending the same.

9. In a locket, a body portion, a frame hinged to said body portion, a disk in said frame apertured adjacent thereto, and suspending means passed through said apertured disk, the body portion being marginally recessed to receive said suspending means.

In testimony whereof I have signed this specification in the presence of two subscribing witnesses.

FREDERICK A. KOHLHEPP.

Witnesses:
HOWARD P. KING,
MILDRED E. BROOKS.